(12) United States Patent
Anderson et al.

(10) Patent No.: US 6,570,740 B1
(45) Date of Patent: May 27, 2003

(54) TAPE GUIDE WITH WEAR RESISTANT COATING

(75) Inventors: James C. Anderson, Eagle, ID (US); Darin D. Lindig, Meridian, ID (US); Jeffrey S. McAllister, Boise, ID (US); Carl R. Hoerger, Boise, ID (US); Catherine Dinhobl, Vienna (AT); Martin Haupt, Vienna (AT); Josef Summer, Neunkirchen (AT)

(73) Assignees: Hewlett-Packard Development Company, L.P., Houston, TX (US); Philips Semiconductor Gratkorn, Gratkorn (AT)

( * ) Notice: Subject to any disclaimer, the term of this patent is extended or adjusted under 35 U.S.C. 154(b) by 368 days.

(21) Appl. No.: 09/643,317

(22) Filed: Aug. 21, 2000

(51) Int. Cl.[7] ............................................. G11B 15/60
(52) U.S. Cl. ................................................. 360/130.21
(58) Field of Search ........................ 360/130.2–130.24

(56) References Cited

U.S. PATENT DOCUMENTS

| 4,238,088 A | * 12/1980 | Schoettle ............... 360/130.21 |
| 4,646,177 A | * 2/1987 | Sanford ........................ 360/95 |
| 5,542,593 A | 8/1996 | Skaar et al. ................. 226/196 |
| 5,638,238 A | 6/1997 | Kubota et al. .......... 360/130.21 |

FOREIGN PATENT DOCUMENTS

| JP | 5-101316 | 4/1993 | .............. 360/130.2 |
| JP | 50114202 | 5/1993 | .............. 360/130.2 |
| JP | 5-151666 | 6/1993 | .............. 360/130.2 |
| JP | 5-166113 | 7/1993 | .............. 360/130.2 |
| JP | 6-139665 | 5/1994 | .............. 360/130.2 |
| JP | 8-321100 | * 12/1996 | ............ 360/130.22 |

* cited by examiner

Primary Examiner—A. J. Heinz (57) ABSTRACT

A tape guide in which the corner geometry between the flanges and the hub prevents the tape from abruptly bumping the flange and in which the corner is coated with a very hard wear resistant material such as titanium aluminum nitride, tungsten carbide, silicon nitride, chromium nitride or diamond like carbon.

16 Claims, 7 Drawing Sheets

TAPE GUIDE WITH WEAR RESISTANT COATING

FIELD OF THE INVENTION

The present invention relates generally to tape drives and, more particularly, to flanged tape guides having a wear resistant coating.

BACKGROUND

Information is recorded on and read from a moving magnetic tape with a magnetic read/write head positioned next to the tape. The magnetic "head" may be a single head or, as is common, a series of read/write head elements stacked individually and/or in pairs within the head unit. Data is recorded in tracks on the tape by moving the tape lengthwise past the head. The head elements are selectively activated by electric currents representing the information to be recorded on the tape. The information is read from the tape by moving the tape longitudinally past the head elements so that magnetic flux patterns on the tape create electric signals in the head elements. These signals represent the information stored on the tape.

Data is recorded on and read from each of the parallel tracks on the tape by positioning the head elements at different locations across the tape. That is, head elements are moved from track to track as necessary to either record or read the desired information. Movement of the magnetic head is controlled by an actuator operatively coupled to some type of servo control circuitry. Tape drive head positioning actuators often include a lead screw driven by a stepper motor, a voice coil motor, or a combination of both. The carriage that supports the head is driven by the actuator along a path perpendicular to the direction that the tape travels. The head elements are positioned as close to the center of a track as possible based upon the servo information recorded on the tape.

Figure 1:
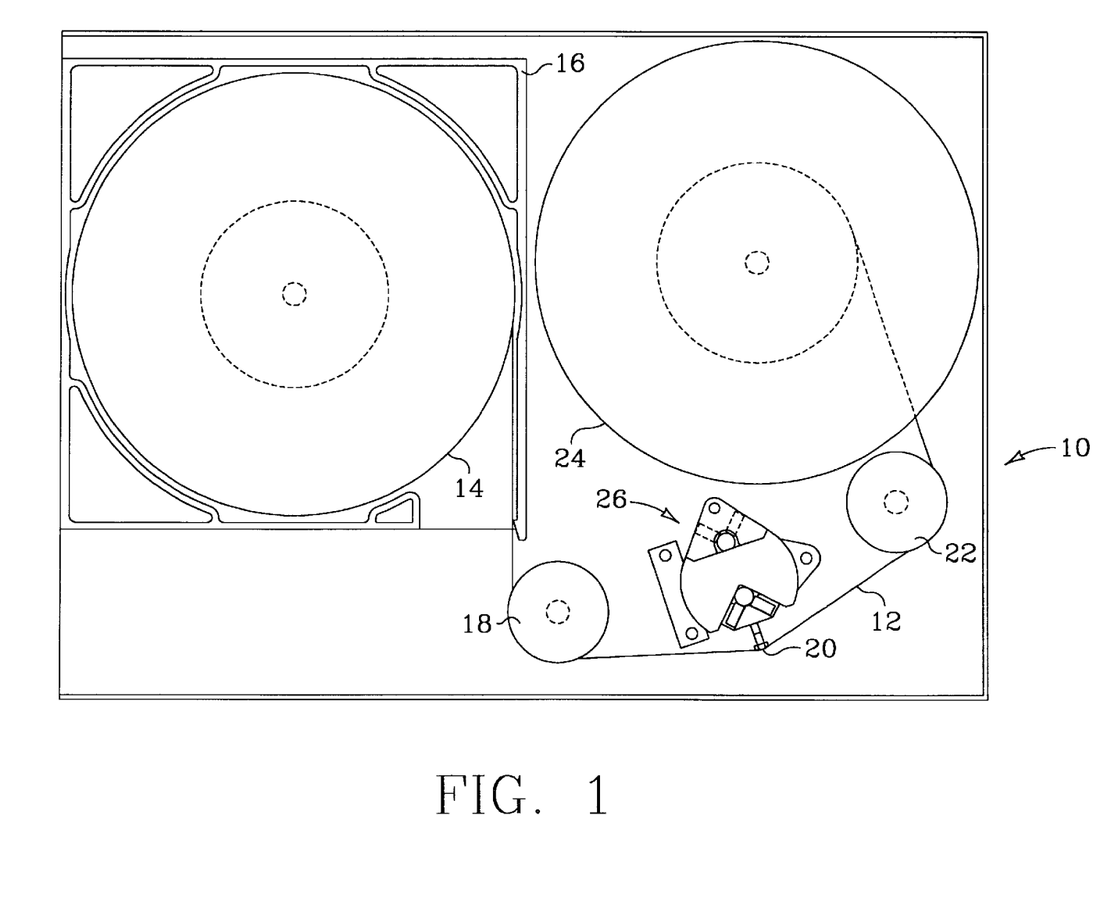
FIG. 1 is a top down plan view of a single spool tape drive.
Figure 2:
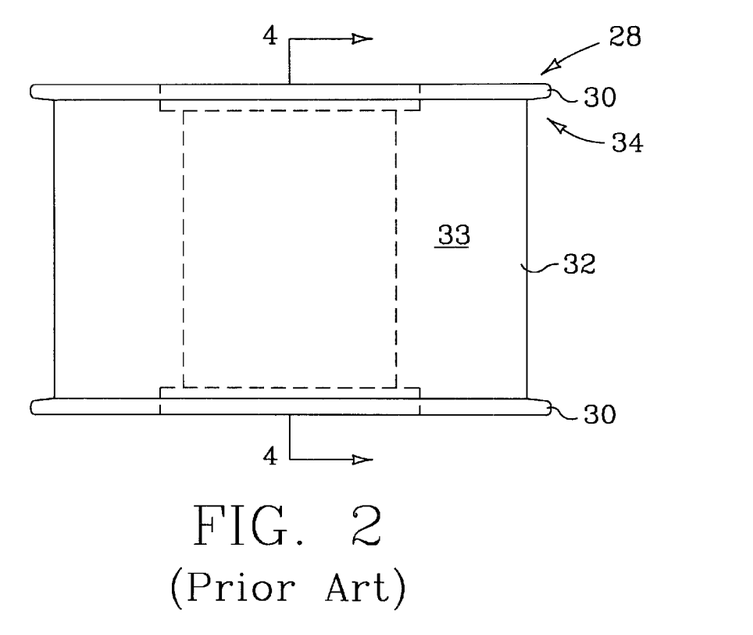
FIGS. 2 and 3 are plan and elevation views of a conventional roller tape guide.
Figure 3:
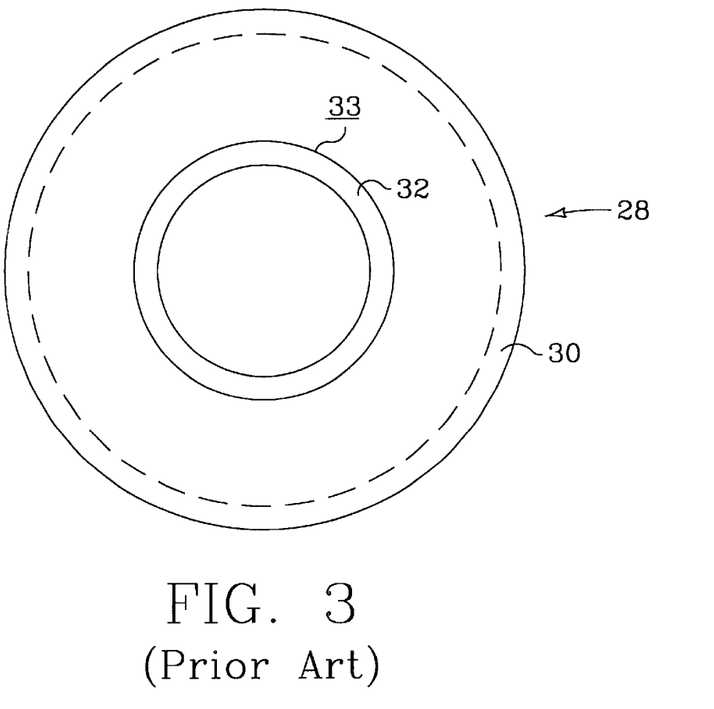
Figure 4:
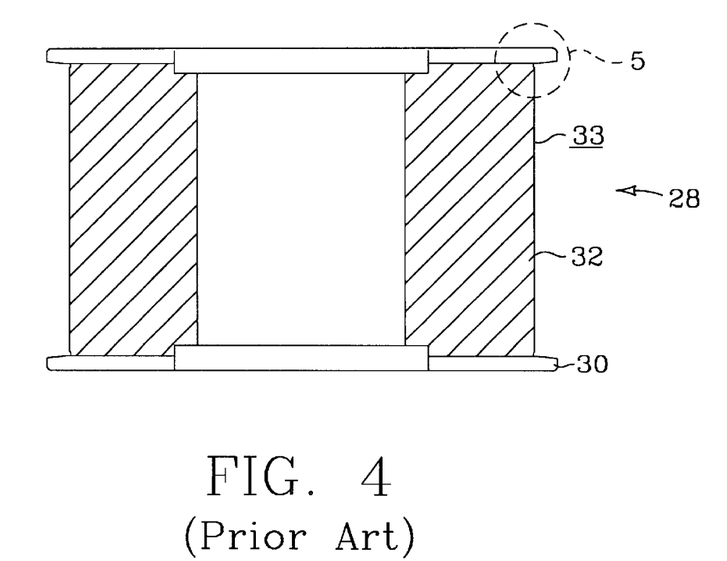
FIG. 4 is a cross section view of the roller guide of FIGS. 2 and 3 taken along the line 4—4 in FIG. 3.

FIG. 1 illustrates generally the configuration of a tape drive 10 typical of those used with single spool tape cartridges. Referring to FIG. 1, a magnetic tape 12 is wound on a single supply spool 14 in tape cartridge 16. Tape cartridge 16 is inserted into tape drive 10 for read and write operations. Tape 12 passes around a first tape guide 18, over a magnetic read/write head 20, around a second tape guide 22 to a take up spool 24. Head 20 is mounted to a carriage and actuator assembly 26 that positions head 20 over the desired track or tracks on tape 12. Head 20 engages tape 12 as tape 12 moves across the face of head 20 to record data on tape 12 and to read data from tape 12. Tape guides 18 and 22 may be either roller guides or fixed guides. A conventional roller guide is shown in FIGS. 2–5. Referring to FIGS. 2–5, roller guide 28 includes disc shaped flanges 30 and an annular hub 32. Flanges 30 and hub 32 may be machined as a single integral part or as three separate parts bonded together. In either case, flanges 30 function to keep tape 12 at the proper angle as it passes across head 20. If the tape is presented to the head at too great an angle, then the read and write elements in the head may be misaligned to the data tracks. Flanges 30 are also needed to help keep tape 12 properly packed on take up spool 24.

Figure 5:
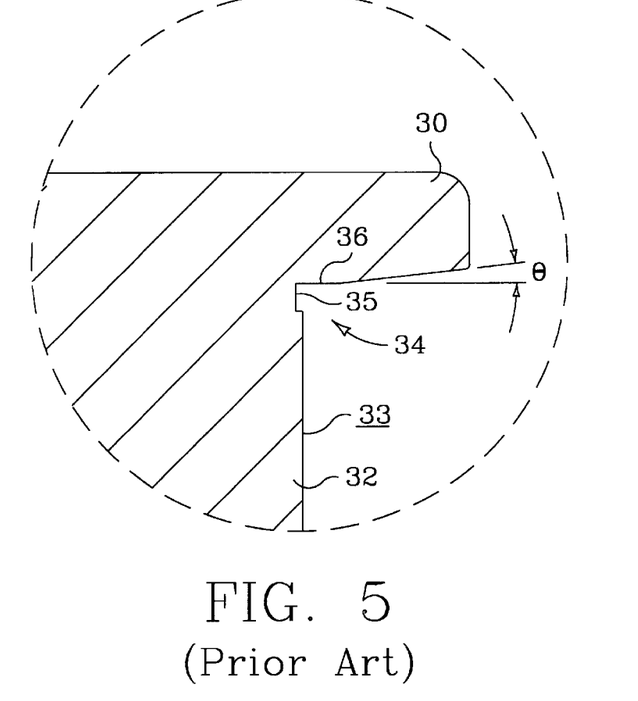
FIG. 5 is a detail cross section view of the corner between the flange and the hub of the roller guide of FIG. 4.

As shown in the detail of FIG. 5, conventional guides have a square corner 34 at the intersection of hub 32 and flange 30. Corner 34 is usually formed at 90° or slightly greater than 90° (as indicated by angle θ in FIG. 5). If corner 34 is greater than 90°, then a small flat area 36 is often used to make it easier to measure the spacing between flanges 30 at corner 34. Also, because it is difficult to make a perfectly square corner, a small undercut 35 is often machined into the corner of conventional guides to ensure a flat flange surface is presented to the tape at corner 34.

As the tape is pulled over the guides, a film of air is created between the outside surface 33 of hub 32 and tape 12. This film is often referred to as an air bearing. The air bearing allows the tape to move with low friction very rapidly between flanges 30. Consequently, high frequency tape movement can occur when the edge of the tape bumps abruptly against the flanges 30 at corner 34. The read/write head positioning systems have difficulty following such high frequency tape movement.

U.S. patent application Ser. No. 09/510,834 now abondoned discloses a tape guide in which the corner geometry between the flanges and the hub prevents the tape from abruptly bumping the flange. The tape guide of the '834 Application, which is incorporated herein by reference in its entirety, includes a hub, a pair of spaced apart parallel flanges extending out from the hub and a corner defining the intersection of the hub and each flange. The corners are configured to apply progressively more force to the edge of the tape as the tape moves around the corner from the hub toward the flange. For example, in one version of the tape guide of the '834 Application shown in FIG. 9, the corners are rounded. These corner configurations are designed to urge the tape more gently away from the flange at a much lower rate of acceleration. Guiding the tape in this manner allows for smoother movement of the tape which in turn allows the head positioning system to better follow the tape as it wanders back and forth between the guide flanges.

Figure 11:
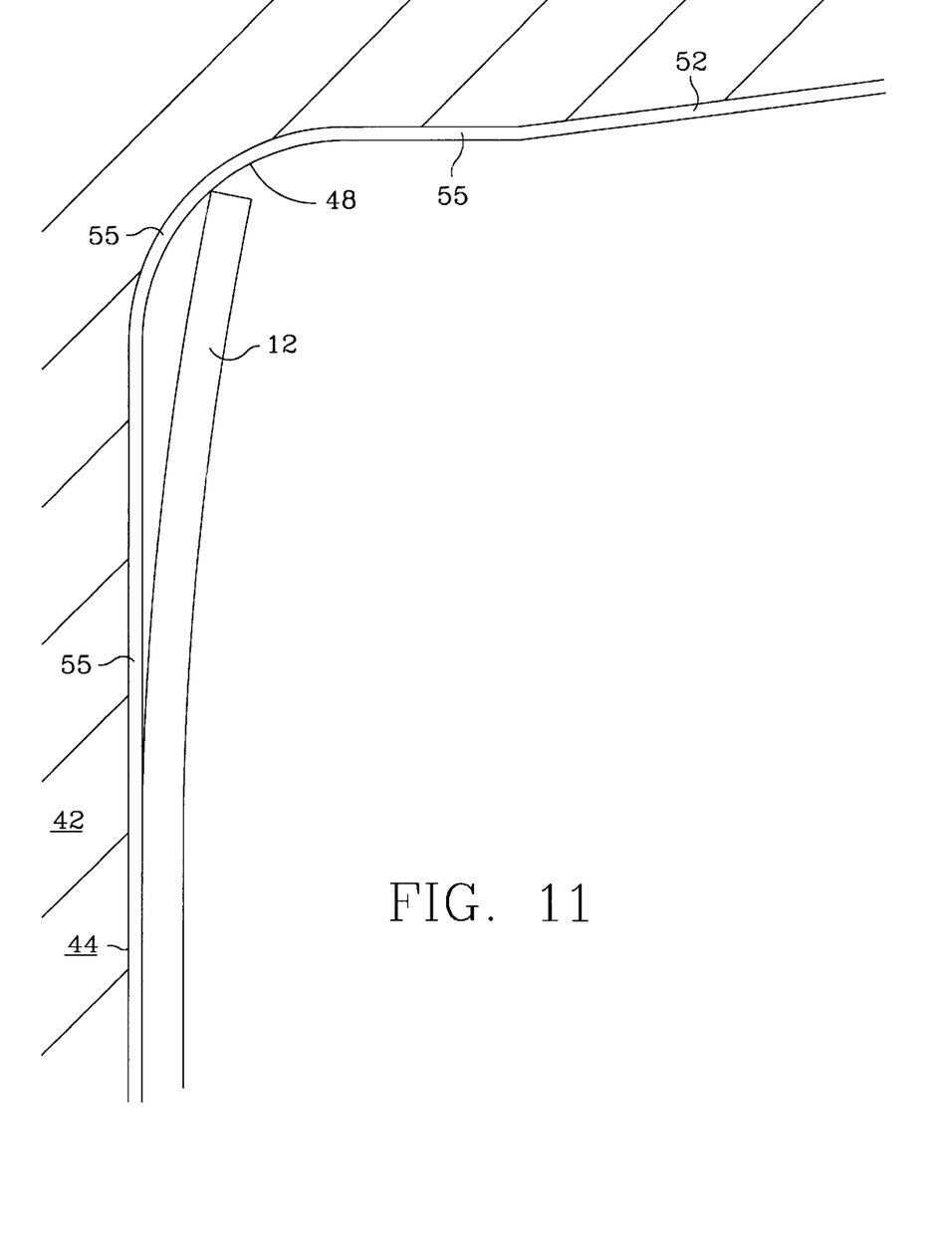
FIG. 11 is a more detailed view of the corner shown in FIG. 9 illustrating the tape moving around the corner.

As shown in FIG. 11, the edge of the tape rides on the rounded corner of this new tape guide roller. Since the edge of the tape is somewhat abrasive, it may tend to wear the corners of the roller. This abrasive characteristic is more pronounced with unused tape because the slitting operation used to form the tape leaves the corner of the new tape relatively sharp.

As shown in FIG. 5 and described above, most conventional tape guide rollers have a small undercut or "relief" machined into the corner. Conventional rollers are usually made from aluminum with an electroless nickel coating. Aluminum is used because it is easily machined to a good surface finish and it is inexpensive.

Electroless nickel coating is much harder than aluminum and protects the surface against wear and corrosion. The nickel coating provides adequate protection for conventional rollers since the edge of the tape does not ride up on the corner. It has been observed, however, that nickel coating on the new rounded corner rollers of the '834 Application wears more quickly than is desirable. As the nickel coating wears the rounded corner, the tape may begin to bump more abruptly against an edge or edges worn into the corner.

SUMMARY

Accordingly, the present invention is directed to a tape guide like that described in the '834 Application in which the corner region is coated with a very hard material such as titanium aluminum nitride, tungsten carbide, silicon nitride, chromium nitride or diamond like carbon. Even thin coatings of such materials can be formed to exhibit a surface hardness greater than 10 gigaPascals (GPa). It is expected that coating materials applied to the roller that exhibit a hardness of at least 10 GPa will be sufficient to withstand tape wear in the corners of the roller for tape materials currently used in the manufacture of magnetic data storage tapes.

A tape guide constructed according to the present invention includes a hub, a pair of spaced apart parallel flanges extending out from the hub, and a corner defining the intersection of the hub and each flange. The corners are configured to apply progressively more force to the edge of the tape as the tape moves around the corner from the hub toward the flange. The corners are coated with a material that when applied to the roller exhibits a hardness of at least 10 Gpa. Suitable coating materials include titanium aluminum nitride, tungsten carbide, silicon nitride, chromium nitride or diamond like carbon.

DETAILED DESCRIPTION

As noted above, FIG. 1 illustrates generally the configuration of a tape drive typical of those used with single spool tape cartridges. Referring again to FIG. 1, a magnetic tape 12 is wound on a single supply spool 14 in tape cartridge 16. Tape cartridge 16 is inserted into tape drive 10 for read and write operations. Tape 12 passes around a first tape guide 18, over a magnetic read/write head 20, around a second tape guide 22 to a take up spool 24. Head 20 is mounted to a carriage and actuator assembly 26 that positions head 20 over the desired track or tracks on tape 12. Head 20 engages tape 12 as tape 12 moves across the face of head 20 to record data on tape 12 and to read data from tape 12. Tape guides 18 and 22 may be either roller guides or fixed guides.

Figure 6:
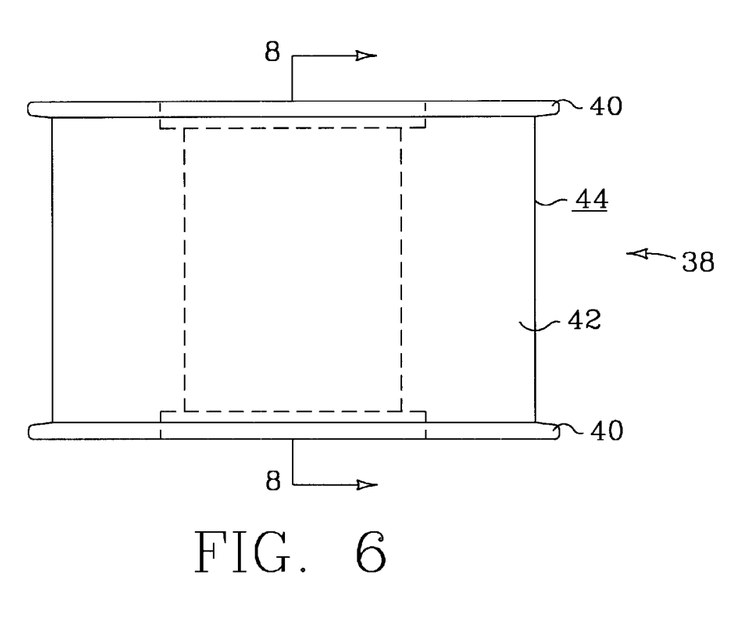
FIGS. 6 and 7 are plan and elevation views of a roller tape guide constructed according to one embodiment of the present invention.
Figure 7:
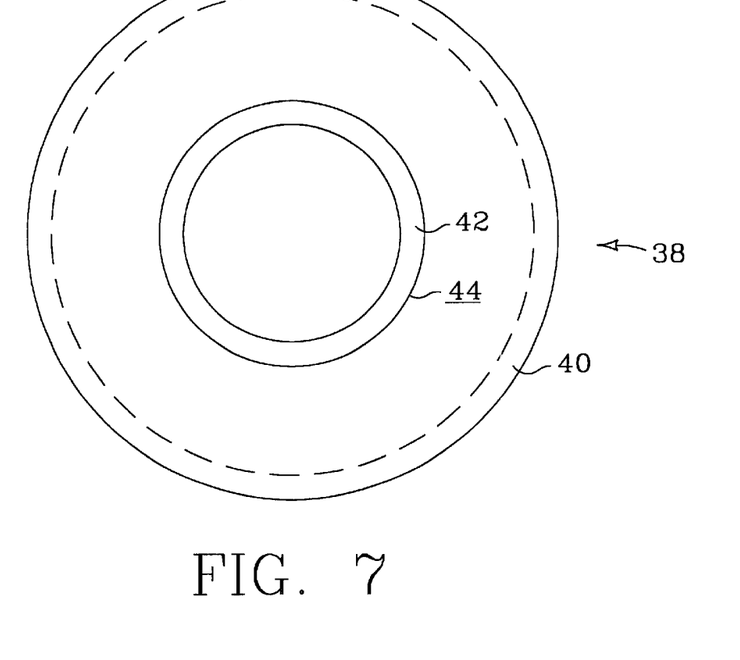
Figure 8:
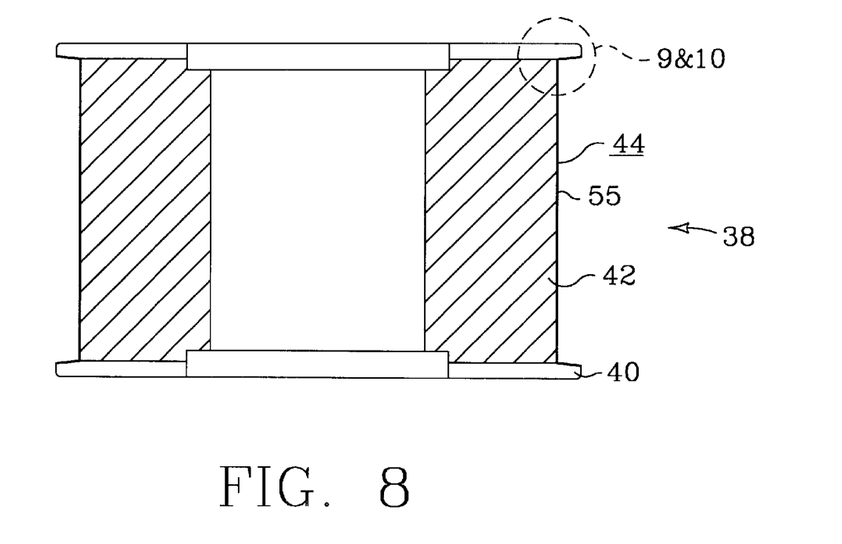
FIG. 8 is a cross section view of the roller guide of FIGS. 6 and 7 taken along the line 8—8 in FIG. 7.

Roller guides constructed according to the present invention are shown in FIGS. 6–11. The innovative features of the invention are illustrated in the corner structures shown in the detail views of FIGS. 9–11. The details of these new corner structures are not apparent from the smaller scale views of FIGS. 6–8. Referring first to FIGS. 6–8, each roller guide 38 includes disc shaped flanges 40 and an annular hub 42. Tape 12 rides on the outer surface 44 of hub 42. Each flange 40 extends radially past outer surface 44 of hub 42. When roller guide 38 is installed in tape drive 10, for example as guides 18 and 22 in FIG. 1, hub 40 rotates on a fixed pin or axle that extends from the tape drive chassis or other suitable support through the center of hub 40. Ball bearings or like are preferred to reduce friction and minimize wear between hub 40 and the pin or axle on which it turns. Fixed guides do not rotate and the hub of a fixed guide may be any shape necessary or desired to provide a suitable guiding surface for tape 12. Flanges 40 and hub 42 may be machined as a single integral part or as separate parts bonded together.

Figure 9:
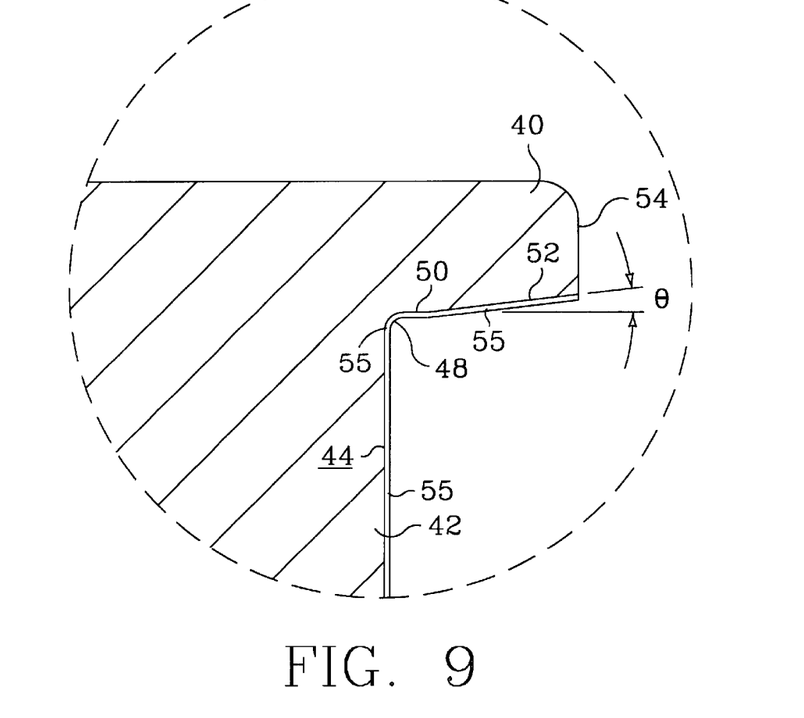
FIG. 9 is a detail cross section view of the corner between the flange and the hub of the roller guide of FIG. 8 in which the corner is rounded.

Referring now to FIG. 9, hub 42 and flanges 40 come together at a rounded corner 48. In this embodiment, rounded corner 48 is a circular curve having a radius in the range of 0.03 mm to 0.5 mm. Preferably, corner 48 transitions to a short flat area 50 on the inside face 52 of flanges 40 and then inside face 52 flares up at an angle θ to outside edge 54 of flanges 40. Flare angle θ is typically in the range of 0.50° to 10°. Because the corner radius is usually quite small, a flat area 50 makes it easier to measure the spacing between flanges 40 at corners 48. A thin coating 55 of a very hard material is applied to outer surface 44 of hub 42 at least covering corner 48. Although coating 55 is only necessary for wear resistance at corner 48, coating 55 will typically be applied to the entire outer surface 44 of hub 42 and the inside face 52 of the flanges 30. Coating 55 should have a hardness of at least 10 GPa to adequately withstand the abrasiveness of new tapes. It is expected that coating 55 applied to a thickness of 1 μm–3 μm will be sufficient for most roller type tape guides to provide adequate wear resistance for the useful life of the guide. A thicker coating may be required for stationary tape guides. Suitable coating materials include titanium aluminum nitride, tungsten carbide, silicon nitride, chromium nitride and diamond like carbon.

FIG. 11 illustrates the edge of tape 12 in rounded corner 48. Rounded corner 48 functions much like a spring—as tape 12 moves around the progressively steeper corner 48 on coating 55 toward flange 40, progressively more force is created to push tape 12 away from flange 40. Hence, tape 12 does not abruptly bump flange 40. Instead, tape 12 is more gently pushed away from flange 40.

Increasing the tape to flange clearance slightly over that of conventional square corner guides should help keep tape 12 from riding continually on rounded corners 48. The spacing between flanges, that is to say the distance between the inside surfaces of the flanges measured from corner to corner, is slightly larger than the width of the tape. Hence, there is a clearance between the tape and the flanges that allows the tape to pass unimpeded between the flanges. For example, for ½ inch type data storage tapes that have a nominal tape width of 12.650 mm, it is expected that increasing the tape to flange clearance by 0.01 mm–0.02 mm (10–20 microns) over the clearance of a square corner guide will be effective to help keep tape 12 off rounded corners 48. Hence, a typical square corner tape to flange clearance of 0.02 mm would be increased to 0.03 mm–0.04 mm in a comparable tape guide that uses the new rounded corner. This is only one example, however. The necessary or desirable clearance may be effected by the size of the corner radius or other corner geometry, tape width and thickness and other operating parameters.

Figure 10:
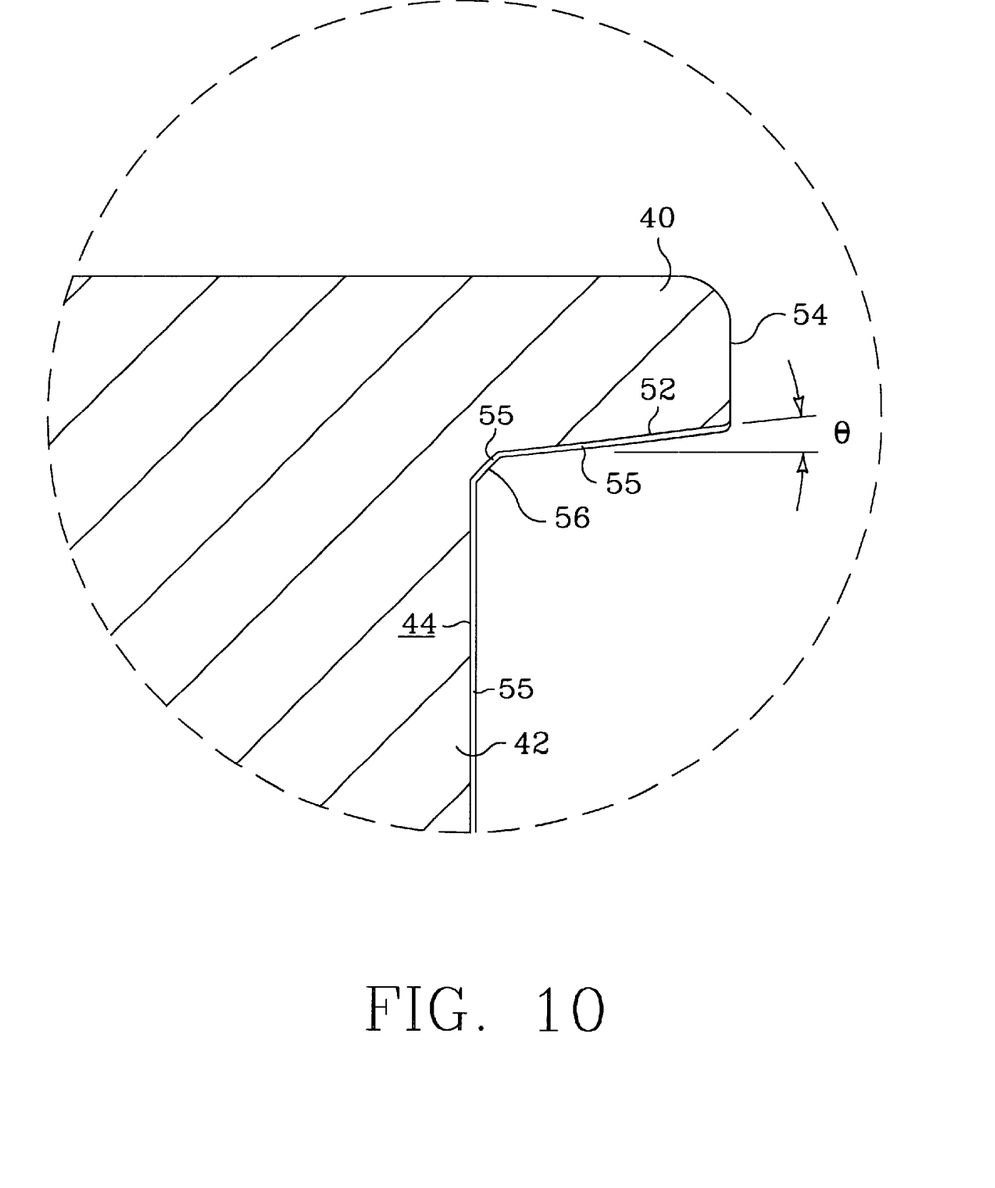
FIG. 10 is a detail cross section view of the corner between the flange and the hub of the roller guide of FIG. 8 in which the corner is chamfered.

Although a circular curve having radii in the range noted above will effectively reduce high frequency transient tape movement caused by the tape abruptly bumping flange 40, it is expected that other radii or other corner configurations will also help reduce this type of transient tape movement. For example, a radii as small as 0.01 mm should provide some beneficial effect. The chamfered corner 56 illustrated in FIG. 10 should also help reduce transient tape movement. Referring to FIG. 10, hub 42 and flange 40 intersect at a rectilinear corner 56 which, in this embodiment, is a 45° chamfer. Other configurations are possible. What is important is that each corner be configured to apply progressively more force to the edge of the tape as the moves around the corner from the hub toward the flange. Also, while it is expected that the desired wear resistance will be achieved by applying a thin coating of very hard material to the corners of the guide, the desired wear resistance could be achieved by coating the entire surface of the hub or forming the entire guide from a suitably hard material. Other configurations might also be possible. It is to be understood, therefore, that other variations of and modifications to the embodiments shown and described may be made without departing from the spirit and scope of the invention which is defined in following claims.

What is claimed is:

1. A tape guide, comprising a hub, spaced apart parallel flanges extending out from the hub and a corner defining the intersection of the hub and each flange, the tape passing over the hub between the flanges, each corner configured to apply progressively more force to an edge of the tape as the edge of the tape moves around the corner from the hub toward the flange and each corner having a surface hardness of at least 10 GPa.

2. The tape guide of claim 1, wherein the corner is rounded.

3. The tape guide of claim 1, wherein the corner is chamfered.

4. The tape guide of claim 1, wherein the surface of each corner comprises a coating of material that when applied to the corner exhibits a hardness of at least 10 GPa.

5. The tape guide of claim 4, wherein the coating is 1 $\mu$m–3 $\mu$m thick.

6. The tape guide of claim 4, wherein the material comprises titanium aluminum nitride, tungsten carbide, silicon nitride, chromium nitride or diamond like carbon.

7. A tape guide, comprising a hub, spaced apart parallel flanges extending out from the hub and a corner defining the intersection of the hub and each flange, the tape passing over the hub between the flanges, each corner configured to apply progressively more force to an edge of the tape as the edge of the tape moves around the corner from the hub toward the flange and each corner having a surface formed of titanium aluminum nitride, tungsten carbide, silicon nitride, chromium nitride or diamond like carbon.

8. The tape guide of claim 7, wherein the surface of each corner comprises a coating of titanium aluminum nitride, tungsten carbide, silicon nitride, chromium nitride or diamond like carbon.

9. The tape guide of claim 8, wherein the coating is 1 $\mu$m–3 $\mu$m thick.

10. The tape guide of claim 7, wherein the corner is chamfered.

11. The tape guide of claim 7, wherein the corner is rounded.

12. The tape guide of claim 11, wherein the rounded corner comprises a circular curve having a radius in the range of 0.03 mm to 0.5 mm.

13. A tape drive, comprising:

a read/write head;

an actuator operatively coupled to the head, the actuator configured to move the head in a direction generally perpendicular to the direction of motion of the tape over the head;

a tape guide disposed near the head, the tape guide comprising a hub, spaced apart parallel flanges extending out from the hub and a corner defining the intersection of the hub and each flange, the tape passing over the hub between the flanges, each corner configured to apply progressively more force to an edge of the tape as the edge moves around the corner from the hub toward the flange and each corner having a surface hardness of at least 10 Gpa.

14. The tape drive of claim 13, wherein the surface of each corner is formed of titanium aluminum nitride, tungsten carbide, silicon nitride, chromium nitride or diamond like carbon.

15. The tape drive of claim 13, wherein the corner of the tape guide is rounded.

16. The tape drive of claim 13, wherein the corner of the tape guide is chamfered.

* * * * *